United States Patent
Kemp et al.

(10) Patent No.: US 9,441,761 B2
(45) Date of Patent: Sep. 13, 2016

(54) TELESCOPING MAST CABLE MANAGEMENT SYSTEM

(71) Applicant: Raytheon Company, Waltham, MA (US)

(72) Inventors: Steven P. Kemp, Boxborough, MA (US); Gary E. Marcelynas, Sudbury, MA (US)

(73) Assignee: Raytheon Company, Waltham, MA (US)

( * ) Notice: Subject to any disclaimer, the term of this patent is extended or adjusted under 35 U.S.C. 154(b) by 65 days.

(21) Appl. No.: 14/534,529

(22) Filed: Nov. 6, 2014

(65) Prior Publication Data
US 2016/0131279 A1  May 12, 2016

(51) Int. Cl.
| E04H 12/00 | (2006.01) |
| F16L 3/015 | (2006.01) |
| F16L 3/16 | (2006.01) |
| F16L 3/12 | (2006.01) |
| E04H 12/18 | (2006.01) |

(52) U.S. Cl.
CPC ............. F16L 3/015 (2013.01); E04H 12/182 (2013.01); F16L 3/1226 (2013.01); F16L 3/16 (2013.01)

(58) Field of Classification Search
CPC ........ F21V 21/22; B60P 3/18; B60Q 1/2657; B60Q 1/2611; E04H 12/182; H01Q 1/1235; F16L 3/015; F16L 3/16; F16L 3/1226
USPC ............. 248/157, 176.3, 274.1, 295.11, 333; 52/110, 111, 118
See application file for complete search history.

(56) References Cited

U.S. PATENT DOCUMENTS

| 4,357,785 | A | * | 11/1982 | Eklund | E04H 12/182 212/350 |
| 4,657,112 | A | * | 4/1987 | Ream | B66F 11/04 182/127 |
| 5,101,215 | A | * | 3/1992 | Creaser, Jr. | E04H 12/182 343/883 |
| 5,615,855 | A | | 4/1997 | Marue et al. | |
| 6,767,115 | B2 | * | 7/2004 | Blackwelder | B60P 3/18 362/385 |
| 7,000,357 | B1 | * | 2/2006 | Stearns | H01Q 1/3216 52/110 |
| 7,857,481 | B2 | * | 12/2010 | Oh | B60Q 7/00 362/198 |
| 8,288,973 | B2 | | 10/2012 | Ford | |
| 8,522,511 | B2 | * | 9/2013 | Thoren | E04H 12/182 52/118 |
| 8,695,286 | B2 | * | 4/2014 | Falck-Schmidt | H01Q 1/1235 52/114 |
| 2002/0050112 | A1 | * | 5/2002 | Koch | A47B 9/20 52/651.07 |
| 2013/0341471 | A1 | | 12/2013 | Yang et al. | |

FOREIGN PATENT DOCUMENTS

RU   2494505 C2 *  9/2013

* cited by examiner

*Primary Examiner* — Todd M Epps
(74) *Attorney, Agent, or Firm* — Renner, Otto, Boisselle & Sklar, LLP

(57) ABSTRACT

A telescoping mast with a cable system configured to secure the cable within the space between mast sections, wherein in the stowed configuration, the cable has an expanded zigzag arrangement, and in the deployed configuration, the cable has a compressed zigzag arrangement.

5 Claims, 4 Drawing Sheets

TELESCOPING MAST CABLE MANAGEMENT SYSTEM

FIELD OF THE INVENTION

The present invention is related generally to telescoping masts and more particularly to a system for managing cable in an extending and retracting telescoping mast.

BACKGROUND

Mast systems are used to elevate and support a payload. For example, telescoping antennas are widely used for portable communications, radar systems, surveillance systems, etc. In telescoping masts, a series of mast sections are coaxially aligned to enable capture of each mast section into the next larger section. Telescoping masts provide a compact stowed configuration, which is also known as a nested length, and an extended deployed configuration. As is well known in the art, the stowed configuration facilitates transport of the telescoping mast with its payload to a desired location at which the mast can be positioned for transition to the deployed configuration.

Typically the mast payload has electrical requirements and the mast routes electrical cable to the payload mounted on top of the mast. The cable may be routed externally to the payload. Because telescoping masts are often used in harsh environments, the cable may be exposed to potential damage from debris and from environmental conditions. Conventional cable management systems often include a pulley system that may be positioned internally within the mast or externally within a housing.

SUMMARY

In a first aspect of the invention, there is provided a mast system that includes a telescoping mast having coaxial first and second mast sections, the mast having a stowed configuration and a deployed configuration; the first mast section including an inner surface and exterior surface and an upper end and a lower end, and having a through hole proximate to the upper end; the second mast section including an inner surface and exterior surface and an upper end and a lower end, and having a through hole proximate to the lower end, the second mast section nested within the first mast section; and a cable routed through the through hole of the first mast section, into a gap between the interior surface of the first mast section and the exterior surface of the second mast section, and passing through the through hole of the second mast section; wherein in the stowed configuration, the cable has an expanded zigzag arrangement, and in the deployed configuration, the cable has a compressed zigzag arrangement.

In one embodiment of the mast system, the first mast section further includes a low friction ring on the exterior surface at the lower end, and the second mast section further includes a low friction ring on the interior surface at the upper end.

In one embodiment, in the deployed configuration, the compressed zigzag arrangement of the cable is located in the gap and between the low friction ring of the first mast and the low friction ring of the second mast.

In one embodiment, the zigzag arrangement of the cable includes a series of acute turns between alternating cable sections. Each of the acute turns may be stabilized by a cable thimble.

BRIEF DESCRIPTIONS OF THE DRAWINGS

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figures 1A, 1B:
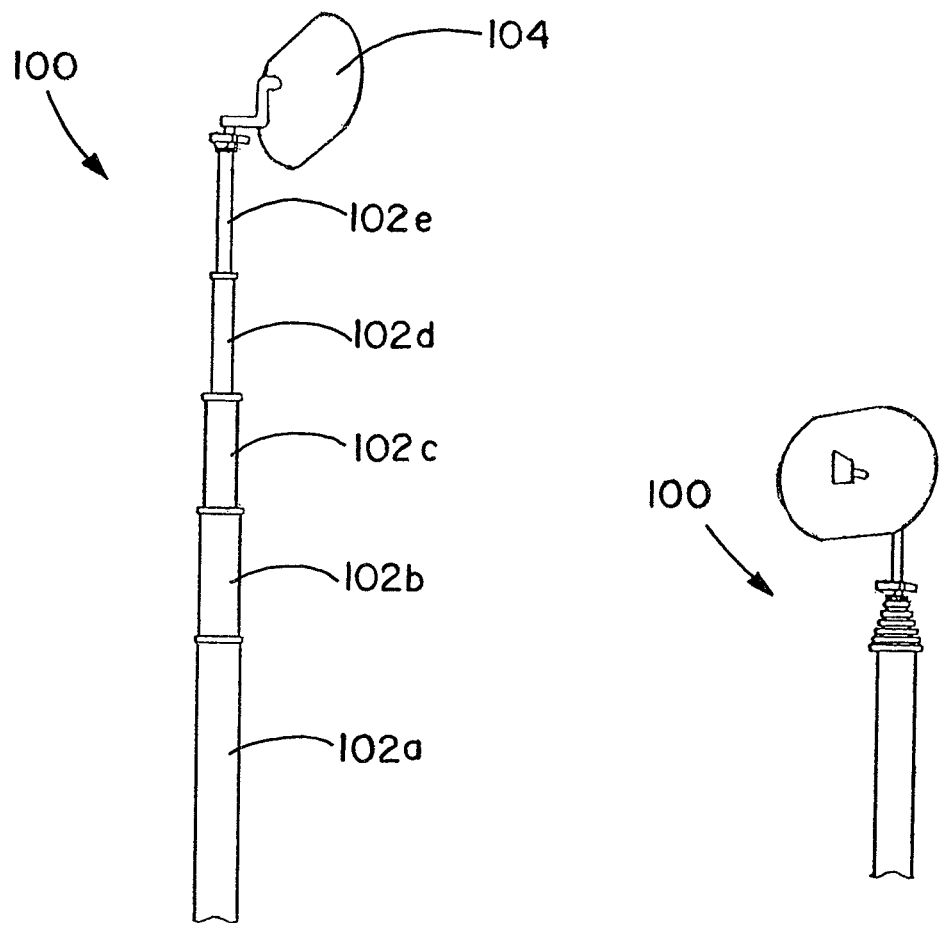
FIGS. 1A and 1B are schematic representations of a telescoping mast system in accordance with exemplary embodiments of the invention in the retracted and extended configurations, respectively.

Referring to FIGS. 1A and 1B, an exemplary telescoping mast system 100 in includes a first mast section 102a, a second mast section 102b, a third mast section 102c, a fourth mast section 102d and a fifth mast section 102e coaxially aligned to enable capture of the second mast section into the first mast section, the third mast section into the second mast section, and so on. The first mast section 102a has a diameter that is slightly larger than a diameter of the second mast section 102b, which has a diameter slightly larger than the third mast section 102c, and so on. For illustrative purposes only, five mast sections 102a-102e are shown supporting payload 104. It is understood that any number of practical mast sections of any suitable geometry can be used to meet the needs of a particular application. FIG. 1A shows an exemplary deployed configuration of the telescoping mast 100 and FIG. 1B shows an exemplary stowed configuration of the telescoping mast 100.

Typically, each mast section is configured as a tube that may be cylindrical or faceted, such as hexagonal, octagonal, etc. For each mast section, a low friction ring (not shown) may be attached at the exterior of the lower end and at the interior of the upper end to facilitate fit with axially adjacent tubes and to reduce the force required to extend the mast sections.

Payload 104 may be an electrical or optical device, such as an antenna, a camera, a lighting fixture, radiation sensor, or any other payload known in the art. While exemplary embodiments of the invention are primarily shown and described as telescoping masts for antennas, it is understood that the inventive telescoping mast cable system is applicable to any mast application for which it is desirable to manage cable during retraction and extension of the mast.

Figure 2A:
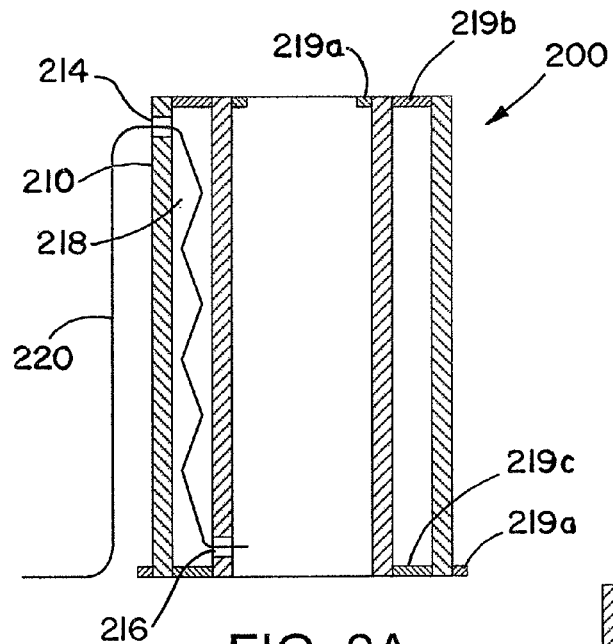
FIGS. 2A and 2B are schematic representations of exemplary embodiments of a mast assembly and cable management system in accordance with the present invention in the retracted and extended configurations, respectively.
Figure 2B:
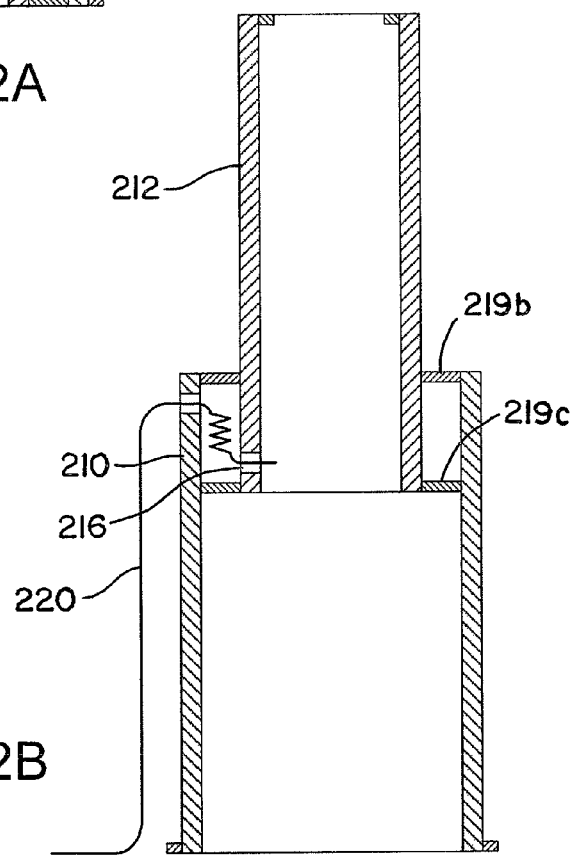

Referring to FIGS. 2A and 2B, an embodiment of the telescoping mast with the cable management system 200 of the present invention includes first mast section 210, second mast section 212 coaxially aligned to enable capture of the second mast section into the first mast section. Low friction rings 219a, 219b, 219c and 219d are attached at the exterior of the lower end and at the interior of the upper end of each of first mast section 210 and second mast section 212. Cable 220 is routed from the outside of the first mast section 210, through first hole 214 located near the top of the first mast section 210, through gap 218 between the first mast section 210 and the second mast section 212, and through second hole 216 located near the bottom of second mast section 212 and into the interior of second mast section 210. From the point at which the cable 220 enters the interior of first mast section 210, cable 220 is preformed into a "folding ladder" or zigzag arrangement. Cable 220 may be electrical or optical cable for transmitting power or signals to or from the payload 104.

As shown in FIG. 2B, as the second mast section 212 extends, the cable folds up into a tight bundle within the gap 218 between the first mast section 210 and the second mast section 212 within the space defined by low friction rings 219b and 219c. With this cable configuration, the cable is less likely to be damaged or to become entangled on sharp edges or hardware within the mast. In addition, the low friction ring 219c located on the outer surface of lower end of the second mast section can be continuous and remain intact, which facilitates maintaining the structural integrity of the mast section.

Figure 3A:
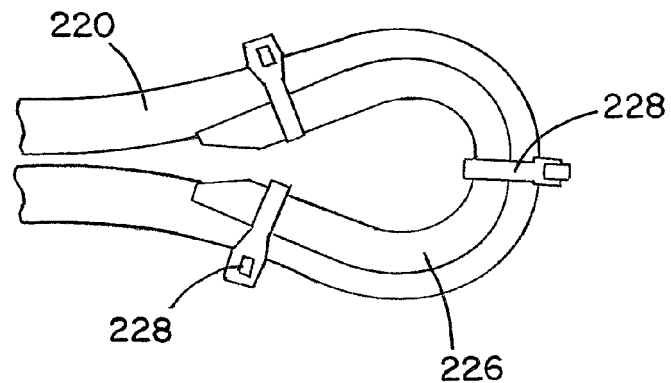
FIG. 3A is a view showing additional detail of the cable management system of FIG. 3.
Figure 3:
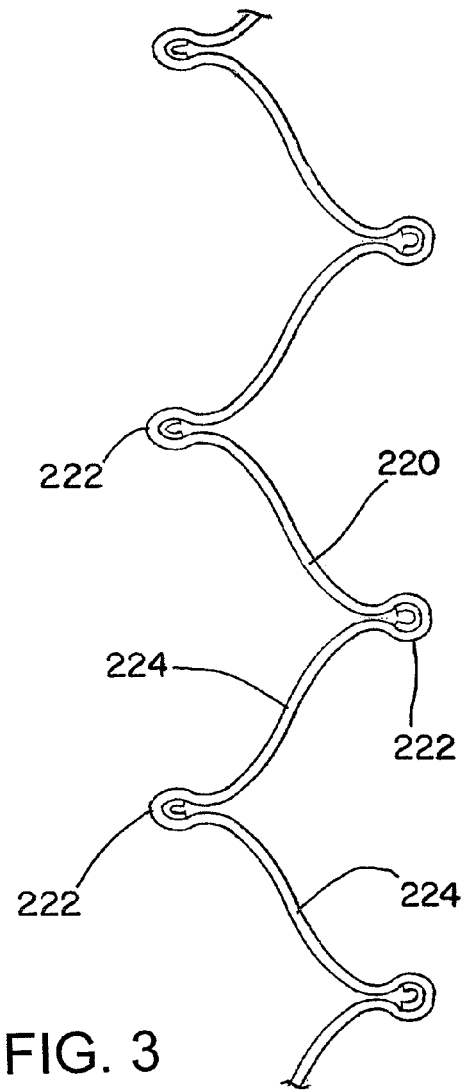
FIG. 3 is a schematic representation of a portion of a cable management system with the mast in a retracted configuration in accordance with exemplary embodiments of the invention.

Referring to FIGS. 3 and 3A, in an exemplary cable arrangement, cable 220 is configured into a folding ladder or zigzag chain structure that includes tight cable loops 222 formed between adjacent cable sections 224. Each cable loop 220 may be formed by securing the cable to a low friction cable thimble 226 with one or more fasteners 228. Fastener 228 may be of any type, and preferably is constructed of a low friction material, such as polymeric tie-wrap or coated wire. In the mast retracted configuration, the zigzag chain structure of the cable arrangement is expanded.

Figure 4:
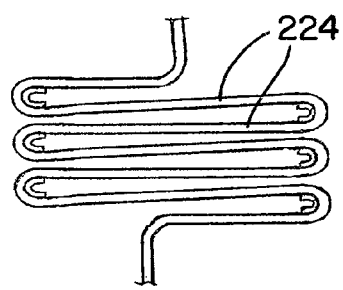
FIG. 4 is a schematic representation of a portion of the cable management system with the mast in an extended configuration in accordance with exemplary embodiments of the invention.

As shown in FIG. 4, in the mast extended configuration, the zigzag chain structure of the cable arrangement is collapsed, so that adjacent cable sections 224 are stacked one on top of another in a compressed bundle.

Figure 5A:
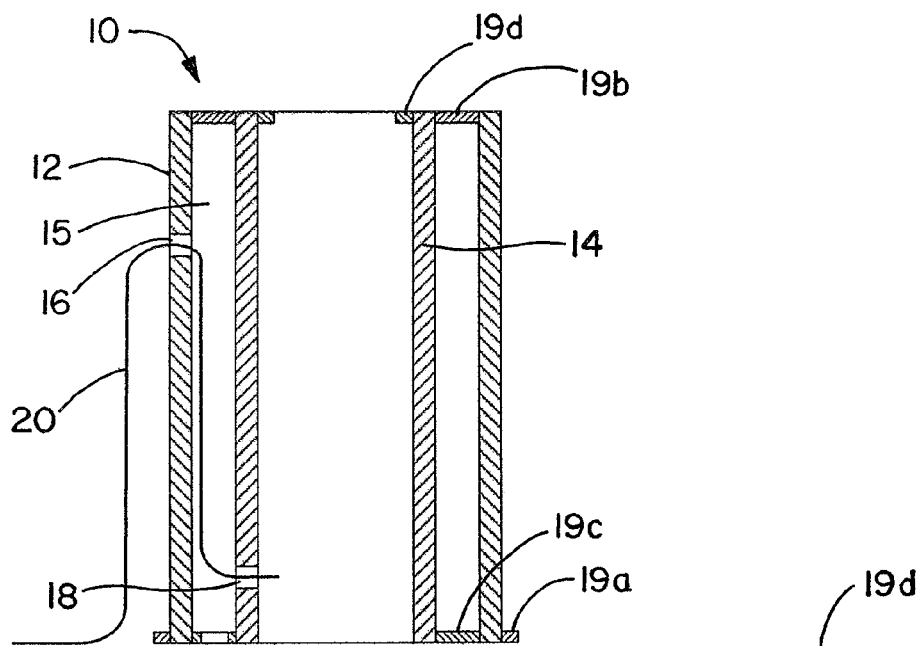
FIGS. 5A and 5B are schematic representations of a telescoping mast and conventional cable routing system in the retracted and extended configurations, respectively.
Figure 5B:
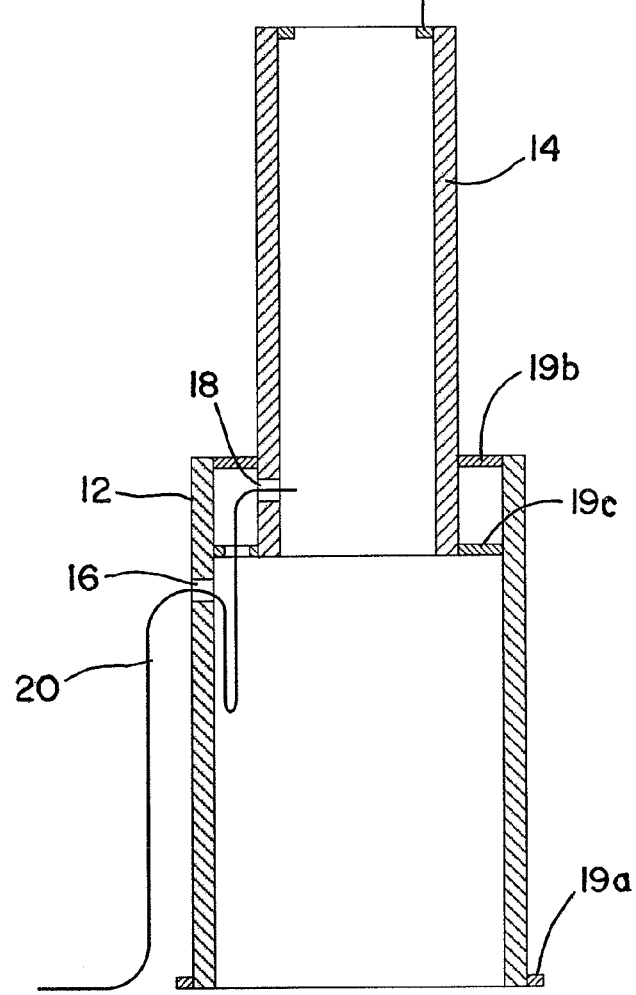

Referring to FIGS. 5A and 5B, a conventional telescoping mast assembly and cable system 10 includes a first mast section 12 and a second mast section 14 coaxially aligned to enable capture of the second mast section into the first mast section. Cable 20 is routed from the outside of the first mast section 12, through first hole 16 located near the top of the first mast section 12, through gap 15 between the first mast section 12 and the second mast section 14, and through second hole 18 located near the bottom of second mast section 14 and into the interior of second mast section 14. The routing of cable 20 to a payload supported on top of the telescoping mast is continued in this manner until the center most mast section is reached. As illustrated in FIG. 5B, as the mast extends, cable 20 forms a "J" wrap that hangs downward below the second mast section 14. Disadvantages of this cable routing method are that the loose "J" wrap is subject to damage or becoming entangled on sharp edges or hardware within the mast. In addition, since cable 20 hangs below the second mast section 14, the low friction ring 19c located on the outer surface of lower end of the second mast section must be removed, which compromises the structural integrity of the mast section.

The cable management system of the present invention solves the problems of the conventional methods of cable routing by creating a flat zigzag cable arrangement that can extend and retract completely within the confines of the available narrow space between the telescoping mast sections. This arrangement offers full protection of the cables and precludes the need to compromise the structural integrity of the mast.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A mast system, comprising:
a telescoping mast having coaxial first and second mast sections, the mast having a stowed configuration and a deployed configuration;
the first mast section including an inner surface and an exterior surface and an upper end and a lower end, and having a through hole proximate to the upper end;
the second mast section including an inner surface and an exterior surface and an upper end and a lower end, and having a through hole proximate to the lower end, the second mast section nested within the first mast section; and
a cable routed through the through hole of the first mast section, into a gap between the interior surface of the first mast section and the exterior surface of the second mast section, and passing through the through hole of the second mast section;
wherein in the stowed configuration, the cable has an expanded zigzag arrangement, and in the deployed configuration, the cable has a compressed zigzag arrangement.

2. The mast system of claim 1, wherein the first mast section further includes a low friction ring on the exterior surface at the lower end, and the second mast section further includes a low friction ring on the interior surface at the upper end.

3. The mast system of claim 2, wherein in the deployed configuration, the compressed zigzag arrangement of the cable is located in the gap and between the low friction ring of the first mast and the low friction ring of the second mast.

4. The mast system of any one of claims 1 to 3, wherein the zigzag arrangement of the cable comprises a series of acute turns between alternating cable sections.

5. The mast system of claim 4, wherein each of the acute turns is stabilized by a cable thimble.

\* \* \* \* \*